Oct. 5, 1965 KAGEMASA SHIRAISHI 3,210,751

CIRCUIT FOR PRODUCING A CURRENT PULSE
UPON A BREAK IN A SERIES CIRCUIT

Filed Feb. 6, 1961

INVENTOR.
KAGEMASA SHIRAISHI

BY
Wenderoth, Lind & Ponack
ATTORNEYS 3,210,751

CIRCUIT FOR PRODUCING A CURRENT PULSE UPON A BREAK IN A SERIES CIRCUIT

Kagemasa Shiraishi, Shinagawa-ku, Tokyo, Japan, assignor to Kabushiki Kaisha Tamura Denki Seisakusho, Tokyo, Japan, a company of Japan Filed Feb. 6, 1961, Ser. No. 87,255
1 Claim. (Cl. 340—256)

This invention is used for supervising the disconnection of another loop circuit or the release of contact points, etc., and more particularly it relates to a circuit system designed so as to actuate an alarm when a loop circuit becomes "disconnected." That is to say, this invention relates to two types of alarm devices, one being characterized by connecting a closed monitor circuit to a semi-conductor emitter circuit in which the collector current is normally cut off but which, when any spot of said monitor circuit is disconnected, flows and is amplified to actuate a relay or an alarm, etc., and the other being characterized by inserting a condenser in a semiconductor emitter circuit, obtaining one pulse to a collector circuit by utilizing the discharge of said condenser to be caused by the cut off of an emitter current, i.e. the disconnection of any spot of a loop circuit connected thereto, and actuating a relay or an alarm, etc. by the current in said collector circuit. The object of this invention is to accurately detect, record or alarm the disconnection of a loop circuit or the cut off of a power source with a very small amount of electricity consumption, and, also, to supervise and accurately warn of any trouble in a remote circuit. The characteristic feature of this invention lies in achievement of an adequate supervisory and warning system with a minimum use of electricity by use of a monitor circuit in which a weak emitter current is normally shunt-circuited, so designed that when this circuit is cut off, the current flows into an emitter and is amplified, and then the accompanying equipment is actuated by the amplified current in the collector circuit, and by the absence of inductive leakage, etc. in the circuit to be supervised because an independent power source is used.

The construction of this invention is explained in detail hereunder by reference to the embodiments illustrated in the drawings, wherein FIG. 1 is a skeleton connection diagram according to the principle of this invention;

Figure 1:
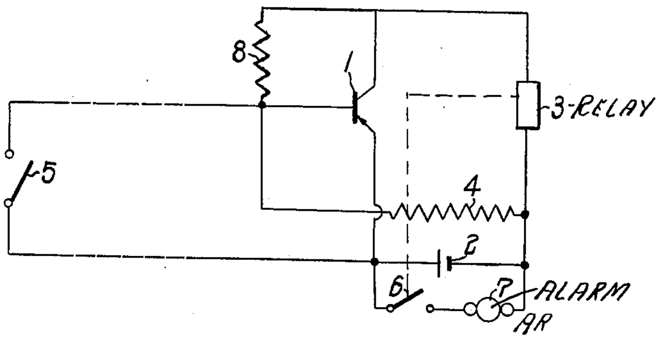
Figure 2:
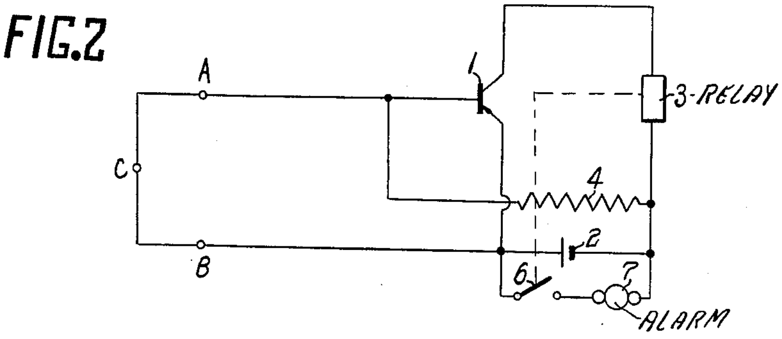
FIG. 2 is a connection diagram of an embodiment having adapted the principle of FIG. 1.

To first explain one embodiment of this invention on the basis of FIGS. 1 and 2: In FIG. 1, 1 is a semi-conductor amplifier; 2, a power source thereof; 3, a relay; 4, a high resistance which fixes both an emitter current of the semi-conductor 1 and the normal current consumption; 5, a contact provided in a loop circuit to be supervised, and in supervising the state of disconnection of the A, C and B parts in a loop circuit shown in FIG. 2, said contact 5, when used for supervising the state of contact of the C part, is removed and the points A and B are directly connected as shown in FIG. 2; and 6, a contact which opens and closes according to the state of excitation of the relay 3 and which, together with an alarm 7 which consists of an alarm bell, a buzzer, or an alarm lamp, etc., constitutes an alarm circuit.

Figures 4, 5:
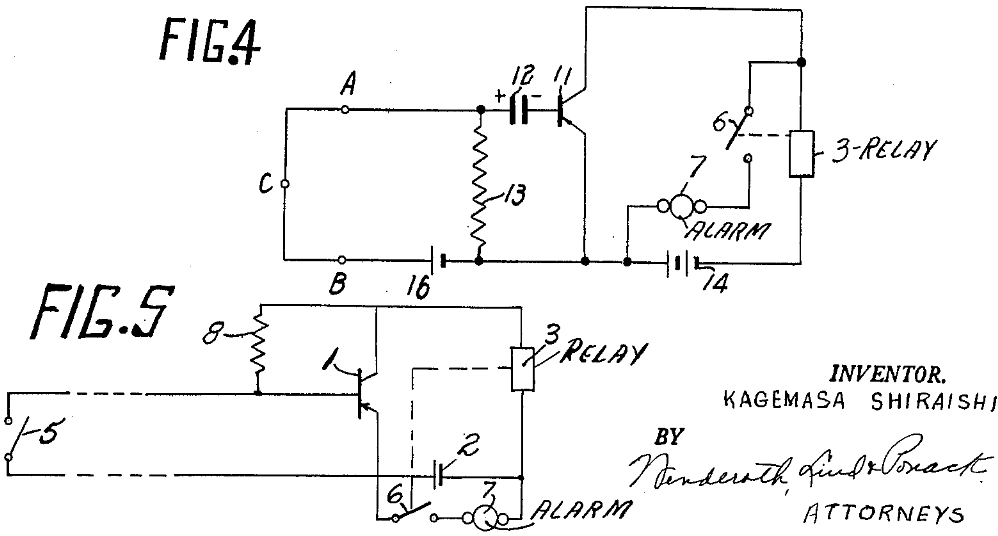
FIG. 4 is a connection diagram showing one embodiment in which the system of FIG. 3 has been adapted to an alarm device.
FIG. 5 is a circuit diagram of a modification of the circuit of FIG. 1.

Incidentally, in order to reduce the amount of electricity which would normally be consumed by semi-conductor 1, high resistance 4 is inserted in the position shown in FIGS. 1 and 2, but there are cases where, from the viewpoint of operation of the semi-conductor 1, said resistance 4 is replaced by a resistance 8 shown in FIG. 5, or the two are used together as shown in FIG. 1.

Also, when the contact 5 in FIG. 1 or the points A, C and B in the loop circuit shown in FIG. 2 are connected, the power source current flowing in the high resistance 4 flows mainly through the contact 5 or the circuit of A, C and B, cutting off the collector current of semi-conductor 1.

In such a construction as is mentioned above, in case the loop circuit which is short-circuited by the contact 5 or the A, C and B parts is disconnected at the contact 5 or the C part, the power source current which has till then been flowing into the high resistance 4, etc., instead of flowing in the resistance 4, flows into an emitter of the semi-conductor 1, and it, as a collector current amplified momentarily by the semi-conductor 1, excites the relay 3, closing the contact 6 attached to said relay, then closing the circuit of the alarm 7, thereby giving an alarm.

In this case, notwithstanding the embodiments shown in FIGS. 1 and 2, it is possible to provide a separate power source to the alarm circuit, and, also, to connect several semi-conductor amplifying stages in cascade for the purpose of raising the sensitivity of the amplifying part or reducing the normal consumption of electricity, etc.

Thus, in the embodiments of FIGS. 1 and 2, because it is easy and accurate to supervise the state of disconnection of a loop circuit by the operation of an alarm, the desired object can be attained fully.

Figure 3:
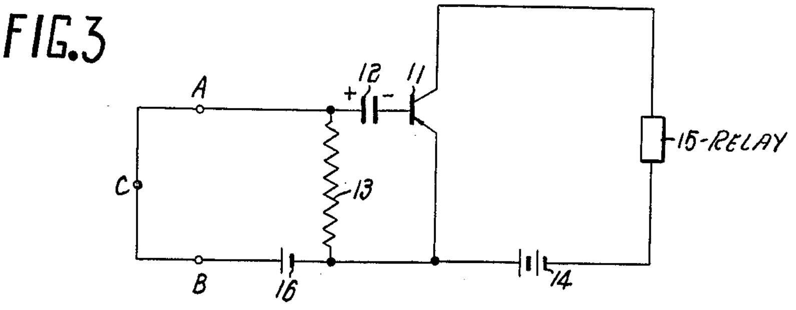
FIG. 3 is a skeleton connection diagram of another embodiment according to the principle of this invention.

Next, an explanation is given of other embodiments shown in FIGS. 3 and 4. FIG. 3 is a skeleton connection diagram, wherein 11 is a transistor; 12, a condenser; 13, a high resistance to be fixed by both an emitter current of the transistor 11 and the condenser 12; 14, a collector power source; 16, a power source for charging the condenser 12 through the emitter, said power source, differing from the usual emitter power source, being inserted in reverse polarity. 15 is the collector load substituted for a relay or a recording apparatus or further for an amplifier in the next stage. A, C and B show a loop circuit to be supervised or detected. To explain the operation of a PNP type semi-conductor, because the emitter power source 16 is inserted in reverse polarity, the condenser 12 is charged as shown with marks, (+) and (−), in FIG. 3, in which case, because the emitter current is cut off, the collector current does not flow.

Now, when the circuit of A, C and B is disconnected at the C point, the electric current charged in the condenser 12 is discharged through the emitter, at which time there flows an amplified collector current, transmitting one pulse to the load 15.

FIG. 4 is a connection diagram showing one embodiment having adapted the system of FIG. 3 to an alarm device, wherein 3 is a relay; 6, a contact which opens and closes according to the state of excitation of the relay 3; and 7, an electric bell (or a buzzer); other symbols also being quite the same as those shown in FIG. 3. In the one constructed as above, when a loop circuit or a power source is disconnected, there flows a collector current due to the discharge of the charged condenser 12, thereby transmitting one pulse to the relay 3. With this one pulse, the relay 3 is excited, setting the contact 6 in operation, whereby the relay 3 maintains itself and, at the same time, closes the circuit of the electric bell 7, thereby energizing an alarm.

As described above, in the embodiments of FIGS. 3 and 4, it is possible to reduce the amount of electricity consumption remarkably, and, because the emitter current is always cut off, it is also possible to accurately detect, record or alarm any trouble of disconnection caused in the loop circuit or the power source, and, what is more, because this device accurately detects any minor trouble by supervising the state of fault in a remote circuit, the desired object can fully be attained.

The above is merely an explanation of some favourable embodiments of this invention, and, therefore, change or omission of any constituent parts described herein and shown in the drawings can, of course, be made according to the need within the spirit and the scope of this invention.

What I claim is:

A circuit for producing a current pulse upon a break in a series circuit, comprising a transistor having a base, a collector and an emitter, a load to be pulsed and a first power source connected in series across the emitter and the collector with the positive side of said first power source connected to said emitter, the load to be pulsed being a relay coil, having a magnetically coupled relay armature in series with an alarm, the series connected relay armature and alarm connected across said first power source; a condenser to which the base of said transistor is connected, said condenser being connected to one end of the series circuit whereby said one end and said condenser and said base of said transistor form a series circuit, a second power source having the negative side connected to the circuit containing said load and the first power source between said first power source and said emitter, said second power source having the positive side connected to the series circuit, and a high resistance connected at one side directly to the negative side of said second power source and at the other side to the side of the condenser which is connected to said one end of the series circuit to form a normal continuous loop circuit which when broken at said series circuit allows said condenser to discharge and said transistor to conduct.

References Cited by the Examiner

UNITED STATES PATENTS

| | | | |
|---|---|---|---|
| 2,622,213 | 12/52 | Harris | 330—12 XR |
| 2,828,450 | 3/58 | Pinckaers | 317—148.5 XR |
| 2,848,658 | 8/58 | Mitchell | 317—148.5 |
| 2,945,133 | 7/60 | Pinckaers | 317—148.5 XR |
| 2,982,868 | 5/61 | Emile | 307—88.5—1.22 |
| 3,014,207 | 12/61 | Principale | 317—148.5 XR |
| 3,061,671 | 10/62 | Waller | 307—88.5—1.22 |

FOREIGN PATENTS 1,155,336 4/58 France.

OTHER REFERENCES

Radio and Television News; "A Transistor Timer" by Garner, Jr., October 1953, pp. 68, 69, 187.

NEIL C. READ, *Primary Examiner.*

RUDOLPH V. ROLINEC, *Examiner.*